June 4, 1940.  B. R. GRANBERG  2,203,298
MACHINE TOOL
Filed Oct. 15, 1937  3 Sheets-Sheet 1
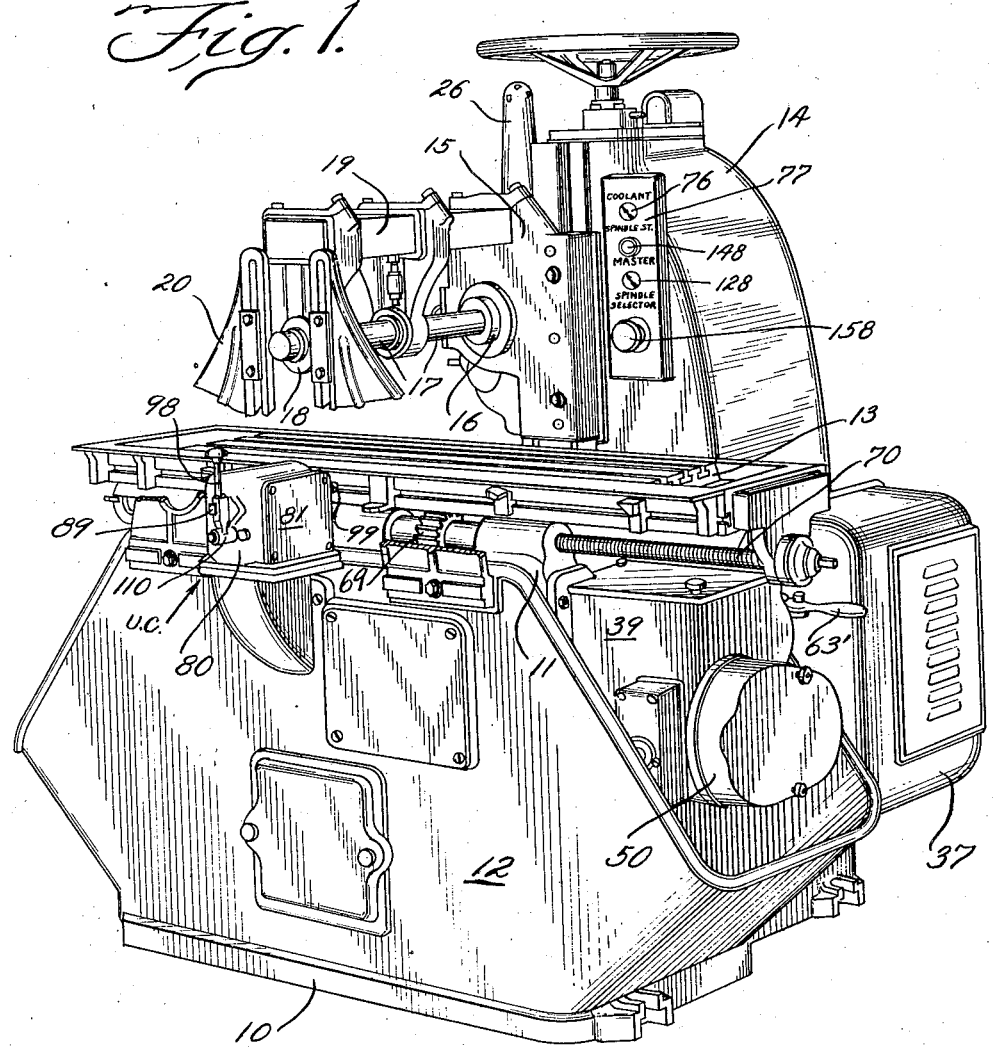

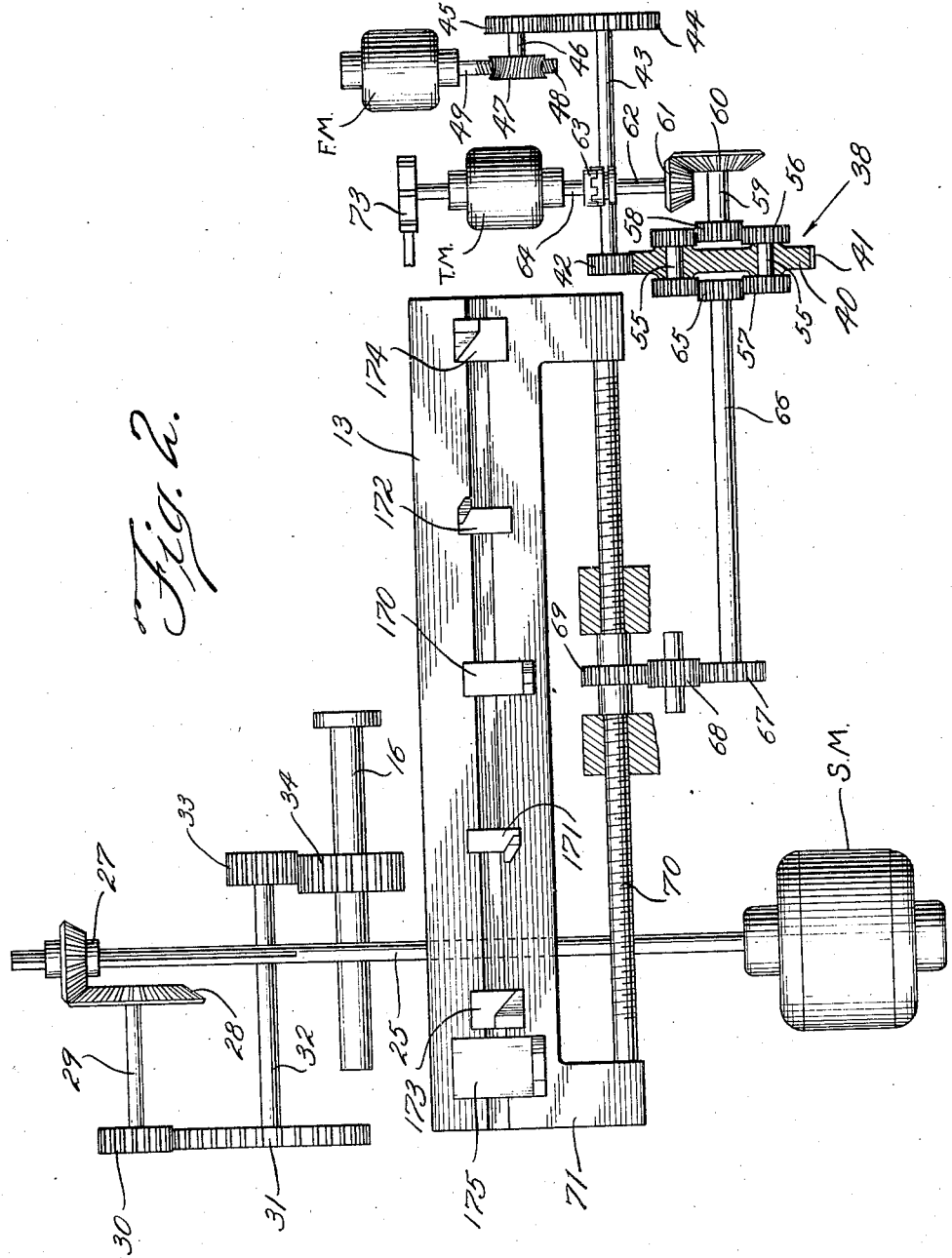

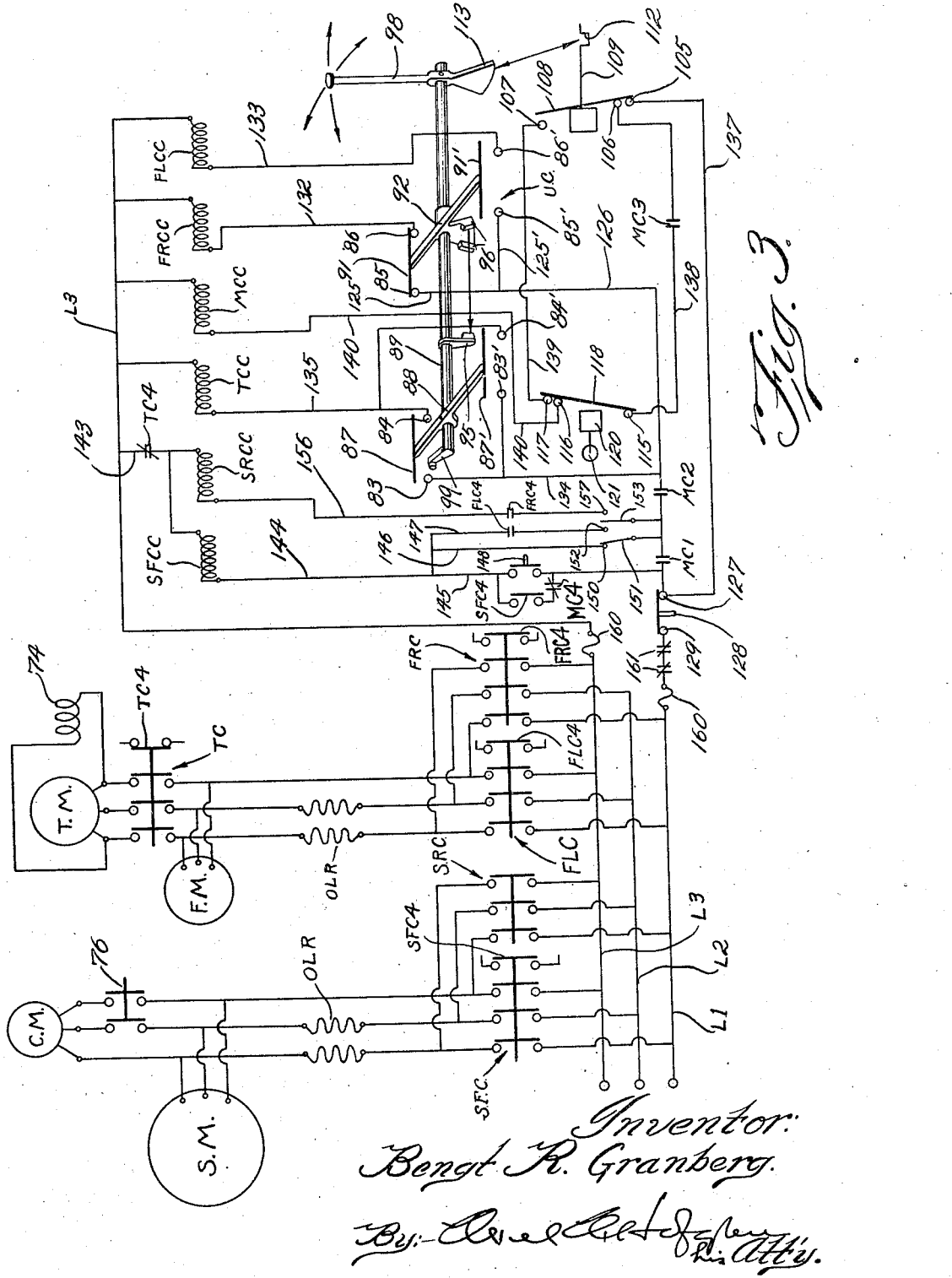

Patented June 4, 1940

2,203,298

UNITED STATES PATENT OFFICE 2,203,298

MACHINE TOOL

Bengt R. Granberg, Rockford, Ill., assignor to Sundstrand Machine Tool Co., Rockford, Ill., a corporation of Illinois Application October 15, 1937, Serial No. 169,242

10 Claims. (Cl. 90—21)

The invention relates to machine tools and has as a general object to provide a machine tool of new and improved construction.

A more particular object of the invention is to provide in a machine tool, having a tool support and a work support, one of which is rotatable and the other of which is reciprocable, new and improved drive means for the supports including a single reversible motor for the rotatable support and a reversible feed motor and a reversible traverse motor for the reciprocable support connected in driving relation therewith through a planetary gearing.

Another object is to provide, in a machine tool of the character described, a new and improved control mechanism affording great flexibility of control with unusual ease and simplicity of operation.

Yet another object is to provide an electrical control mechanism including a unitary controller which governs the major portion of the control functions of the mechanism.

A further object is to provide in a machine tool an electrical control mechanism including a unitary controller having a first means capable of both manual and automatic operation governing rate and direction of movement of an element on the machine tool, a second means for governing starting and stopping of the machine tool and capable of manual actuation independently of the first means, and a third means adapted for automatic actuation and operable to arrest the machine tool, and means actuated in timed relation with the operation of said element for effecting the automatic actuation of said first and third means.

Still a further object of the invention is to provide a machine tool having a rotatable tool support and reciprocable work support with a reversible electric motor for driving the tool support, and a reversible electric feed motor and a reversible electric traverse motor connected through a planetary gearing to drive the work support, and electrical control mechanism for the motors including a main controller both manually and automatically operable, and a selector switch for the tool support motor to obtain rotation in a forward or reverse direction regardless of the direction of movement of the work support or rotation in a direction depending upon the direction of movement of the work support.

Other objects and advantages will become apparent from the following detailed description taken in connection with the accompanying drawings, in which:

Fig. 1 is a perspective view of a machine tool embodying the features of the invention.

Fig. 2 is a diagrammatic view of the gearing driving the tool and work supports.

Fig. 3 is a diagrammatic view of the electrical control mechanism.

Though the invention is susceptible of various modifications and alternative constructions, it is here shown and will be described hereinafter in a preferred embodiment, but it is not intended that the invention is thereby to be limited to the specific form shown, but it is intended to cover all modifications and alternative constructions falling within the spirit and scope of the invention as defined by the appended claims.

While the invention may be embodied in a variety of machine tools, it is for purposes of disclosure illustrated in the drawings and will hereinafter be described as embodied in a milling machine. As illustrated in the drawings, such a machine has a base 10 and a bed 11, in large measure concealed by a chip pan 12, upon which is reciprocable in ways of conventional construction a work supporting carriage 13. At the rear of the machine, rising above the carriage 13, is a column 14 upon which is mounted for vertical adjustment a spindle head 15. Rotatably mounted in the head is a spindle 16 which is adapted to receive a tool supporting arbor 17 extending transversely across the carriage 13 and supported at its outer end, and preferably also at an intermediate point, in journals 18 depending from an overarm 19 secured at its rear end in the spindle head 15. At its forward end, the overarm is preferably supported by braces 20 extending upwardly from the bed of the machine tool. The spindle 16 is adapted to be rotated in either direction and to that end is driven by a reversible electric motor SM which is started and stopped to start and stop the spindle and reversed to reverse the direction of rotation of the spindle. In the present instance, the spindle motor is mounted with its axis vertical (see Fig. 2) and has an elongated armature shaft 25 which extends upwardly into the spindle head 15, which is provided with a tubular housing 26 to accommodate the armature shaft when the head is moved downwardly toward the carriage 13. The upper end of the armature shaft 25 is splined to receive slidably but non-rotatably thereon a bevel gear 27 journaled in the spindle head 15. Meshing with the bevel gear 27 is a second larger bevel gear 28 fixed on one end of a shaft 29 also journaled in the head 15 which has fixed on its other end one gear 30 of a set of pick-off gears for changing the driving ratio between the motor and the spindle. The remaining one of the pick-off gears 31 is fixed on the end of a shaft 32 carrying a gear 33 at its other end meshing with a gear 34 fixed on the spindle 16.

As is well known to those skilled in the art, the carriage 13 is usually reciprocated through a cycle including various combinations of rapid traverse and feed movements. Herein the drive means for the carriage 13 is such that it may be driven both at a feed and a traverse rate of movement in either direction. Accordingly there is provided a reversible electric feed motor FM and a reversible electric traverse motor TM adapted to be started and stopped to start or stop movement of the carriage, and to be reversed to reverse the direction of movement of the carriage. These motors are enclosed in a housing 37 located at the rear of the machine to the right of the column 14, as viewed in Fig. 1, and are connected to drive the carriage through a planetary gear device generally designated 38. As disclosed herein the planetary gear device is enclosed in a housing 39 at the right end of the machine tool and comprises a planet gear carrier 40 having teeth 41 formed on the periphery thereof. Meshing with the teeth 41 is a gear 42 fixed on one end of a shaft 43 the other end of which carries one gear 44 of a set of pick-off gears. The remaining gear 45 of the set of pick-off gears is fixed on one end of a shaft 46 the other end of which carries a worm wheel 47 meshing with a worm 48 fixed on the projecting end of the armature shaft 49 of the feed motor FM. The pick-off gears 44 and 45 are enclosed in a housing 50 which has a removable cover to provide convenient access to the gears to facilitate changing thereof to vary the driving ratio of the feed motor.

Rotatably journaled in the planet gear carrier 40 are a plurality of stub shafts 55 spaced outwardly equal distances from the center of the planet gear carrier 40. Fixed on one end of each shaft is a planet gear 56 and fixed on the opposite end of each shaft is a planet gear. 57. The planet gears 56 are in constant mesh with a sun gear 58 fixed on one end of a shaft 59 the other end of which carries a bevel gear 60. Meshing with the bevel gear 60 is a bevel gear 61 fixed on the end of a shaft 62, carrying on its other end a shiftable element of a clutch 63. Another element of the clutch is fixed on the armature shaft 64 of the rapid traverse motor TM. The shiftable element is actuated by means of a handle 63'. The planet gears 57 on the other hand mesh with a sun gear 65 fixed on the end of a shaft 66 carrying a gear 67 on its other end. This gear in turn meshes with an idler gear 68 meshing with a driving gear 69 splined on a screw shaft 70 mounted to drive the carriage 13. Herein the screw shaft 70 is journaled at its ends in depending portions 71 of the carriage 13, and intermediate its ends threadedly engages nuts (not shown) non-rotatably secured in portions of the bed 11. The driving gear 69 is also journaled in the bed but held against longitudinal movement. Preferably the projecting end of the screw shaft 70 is squared to receive a wrench for moving the carriage by hand when the clutch 63 is shifted to disconnect the traverse motor TM.

Like the spindle 16, the carriage 13 is started and stopped by starting and stopping the feed and traverse motors, and is reciprocated in alternate directions by reversing the direction of rotation of the motors. A feed rate of movement of the table is obtained by operation of the feed motor while the traverse motor is held stationary, while traverse rate of operation of the carriage 13 is obtained by operation of the traverse motor with or without the feed motor being stationary. The worm 48 and the worm wheel 47 in the driving train from the feed motor to the planetary gear device serve as means preventing the feed motor from being driven through the planetary gear device during traverse rate of movement of the carriage, should the feed motor be deenergized, though herein the feed motor normally is running during traverse movement. To hold the sun gear 58 stationary during feed movement of the carriage, a brake 73 of the type disclosed in the pending joint application of Bengt R. Granberg and John B. Sinderson, Ser. No. 66,463, filed Feb. 29, 1936, is provided. Generally, this brake is applied by means of a spring and is released by energization of a solenoid 74 (see Fig. 3).

Referring now more particularly to Fig. 3, the starting, stopping and reversal of the spindle motor SM is controlled by a spindle forward contactor SFC and a spindle reverse contactor SRC interposed between the spindle motor and line wires L1, L2 and L3. Permissibly there is connected in parallel with the spindle motor a coolant motor CM for driving a pump supplying coolant. This motor is further controlled by a switch 76 (see Fig. 3) located at a control or push button panel or station 77 mounted on the column 14 above the carriage 13 so as to be within reach of an attendant standing at the front of the machine.

Similarly, the feed motor and the traverse motor, which are herein shown connected in parallel, are primarily controlled as to starting and stopping, and as to direction of rotation, by means of a feed left contactor FLC and a feed right contactor FRC interposed in well known manner between the motors and the line wires L1, L2 and L3. The traverse motor is further and independently controlled as to starting and stopping by means of a traverse contactor TC which functions to interrupt the circuit to the traverse motor for the purpose of obtaining a feed rate of movement of the carriage and for completing the circuit to the traverse motor for obtaining a rapid traverse rate of movement of the carriage. As previously stated, a spring-applied, solenoid-released brake is provided for holding a portion of the planetary gearing against rotation when the traverse motor is deenergized and accordingly the solenoid 74 of the brake is connected in parallel with the traverse motor so as to be energized when the motor is energized and thereby release the brake, and to be deenergized and permit the brake to be applied when the motor is deenergized.

The forward and reverse contactors for the spindle motor are electrically actuated by means of a spindle forward contactor coil SFCC and a spindle reverse contactor coil SRCC, respectively. Likewise, the left and right contactors for the feed and traverse motors and the traverse contactor are actuated electrically by means of a feed left contactor coil FLCC, a feed right contactor coil FRCC, and a transverse contactor coil TCC, respectively. In addition to the coils just described, there is an actuating coil MCC for a master contactor having three normally open switches MC1, MC2 and MC3 and a normally closed switch MC4.

In order that the various contactors may be actuated to effect starting, reversing and stopping of the various motors to obtain the desired cycle of operation of the spindle and the carriage, a control circuit is provided in which the coils for the various contactors are connected. This control circuit includes, in addition to the coils and the switches of the master contactor, various start-stop and selector switches, and a unitary controller UC having combined manual and automatic actuation and constituting the primary control means of the circuit. This unitary controller is shown diagrammatically in Fig. 3, and in actual construction in Fig. 1, and comprises generally a first control means including a plurality of switches herein associated with the feed left and feed right contactor coils and the traverse contactor coil, thereby constituting a rate and direction control; a second control means including a plurality of switches adapted to be manually actuated and herein associated with the master contactor coil and thereby constituting a start and stop control; and a third control means including a plurality of switches herein adapted to be automatically actuated and also associated with the master contactor coil and thereby constituting a limit control.

The unitary controller is claimed and described in detail in my copending application Serial No. 140,734, filed May 4, 1937. It is believed, however, that the physical construction of the controller may be understood from the present disclosure and the function and operation are clearly set forth. Referring now to Figs. 1 and 3, it will be seen that the unitary controller is so constructed that the rate and direction control, the start and stop control, and the limit control are all housed within a small compact casing generally designated 80, having a base, a top, and forward and rear end walls formed as a single casting. The side walls of the casing are formed by plates 81 removably secured as by bolts. Preferably gaskets are interposed between the plates and the casting in order to prevent, as much as possible, the entry of moisture and foreign material.

The rate and direction control herein is both manually and automatically operable and, moreover, is operable independently of the start and stop control and the limit control, and serves to condition the control circuit preparatory to initiation of operation of the machine tool. As previously stated, the rate and direction control comprises a plurality of switches associated with the feed left and feed right contactor coils and the traverse contactor coil. Herein the switches are four in number, as best seen in Fig. 3, each consisting of two stationary contacts and a movable contact adapted to bridge the two stationary contacts. Four stationary contacts 83, 84 and 85, 86 are mounted in spaced relation longitudinally of the casing on one side thereof. An additional four stationary contacts 83', 84' and 85', 86' are similarly mounted but on the opposite side of the casing.

A movable contact 87 adapted to cooperate with the stationary contacts 83, 84 and a movable contact 87' adapted to cooperate with the stationary contacts 83', 84' are mounted on opposite sides of a T-shaped bracket 88 pinned to an oscillatable shaft 89 extending longitudinally of the casing and journaled in the ends thereof. Similarly a movable contact 91 and a movable contact 91' are mounted on opposite sides of a T-shaped bracket 92 which is loosely mounted upon the shaft 89. The contacts 91 and 91' are adapted to cooperate respectively with the stationary contacts 85, 86 and 85', 86'. Though not shown, each of the movable contacts 87, 87', 91 and 91' is yieldably mounted on its respective bracket 88 or 92.

The bracket 88 has three positions, namely, a neutral position which is that shown in Fig. 3 and in which both movable contacts 87 and 87' are disengaged from the stationary contacts, and an extreme position on either side of neutral in which one of the switches is closed by engagement of a movable contact with the stationary contacts while the other switch remains open, depending upon to which extreme position the bracket is swung. If the bracket 88 is swung to the right, that is clockwise as viewed in Fig. 1 and from the right end in Fig. 3, contact 87 engages and bridges contacts 83, 84 to close the switch formed thereby, while contact 87' is disengaged. If the bracket 88 is swung to the left or counterclockwise, as viewed in Fig. 1, contact 87' engages and bridges contacts 83', 84' to close the switch formed thereby, while the switch formed by the movable contact 87 is open.

The bracket 92 (Fig. 3) has but two positions, namely, a right position and a left position. With the bracket in its right position, as shown in Fig. 3, movable contact 91 engages and bridges contacts 85, 86, while movable contact 91' is disengaged from the contacts 85', 86'. When the bracket 92 is swung to its left position, just the reverse is true with contact 91' engaging its cooperating stationary contacts and contact 91 disengaged from its cooperating contacts. The brackets are yieldably retained in their various positions by suitable means such as star wheel portions each formed with the requisite number of notches and engaged by spring pressed followers.

As previously stated, the bracket 88 is pinned to the shaft 89, while the bracket 92 is loose upon the shaft. In order to obtain a unique movement of the brackets 88 and 92 and the switches controlled thereby, which particularly adapts the controller for use with machine tools, the bracket 92 is actuated by the bracket 88 through a lost motion connection. This lost motion connection is of such a nature that when the bracket 88 is swung to either extreme position the bracket 92 also is swung in the same direction, but when the bracket 88 is merely returned from either extreme position to its neutral position no movement is imparted to the bracket 92. The lost motion connection comprises a lug 95 disposed centrally with respect to the bracket 88 and extending axially to project between spaced lugs 96 carried by the bracket 92 and extending axially so as to overlap the lug 95. It will be seen, with the foregoing arrangement, that upon rotation of the bracket 88 to its extreme position in a clockwise direction, as viewed from the right end in Fig. 3, both contact 87 and contact 91 will engage their respective stationary contacts and that bracket 88 may then be rotated in a counterclockwise direction to its neutral position, thereby disengaging movable contact 87 and stationary contacts 83, 84, while contact 91 remains in engagement with contacts 85, 86. Similarly upon rotation of the bracket 88 to its extreme in a counterclockwise direction, as viewed from the right end in Fig. 3, contact 91 would first be disengaged and then both of the contacts 87' and 91' would be engaged. Upon subsequent rotation of the bracket 88 to its neutral position, movable contact 87' will be disengaged while contact 91' remains engaged.

Means is provided whereby the shaft 89 may be oscillated both manually and automatically for the purpose of closing or opening the switches controlled by the brackets 88 and 92. Accordingly the shaft 89 is made to project through each end wall of the casing and at its forward end the shaft carries a handle 98 whereby it may be manually oscillated in a clockwise or a counter-clockwise direction. At the end projecting through the rear wall of the casing, the shaft has keyed thereto an arm 99 carrying a follower for actuation by dogs mounted on the carriage 13 as will later be described. The follower has a special construction enabling it to be cammed out of the path of certain dogs instead of being shifted thereby to rock the shaft 89.

The start and stop control means is designed to have an operation independent from the rate and direction control yet is so constructed that it may readily be incorporated in the casing 80 and may be mounted so that it may be actuated by the handle 98 through a movement of the handle separate and distinct from the movement actuating the rate and direction control. To that end, the start and stop control comprises two switches formed by three stationary contacts 105, 106 and 107 (Fig. 3) and a movable contact 108 in the form of a tiltable plate provided with contact points positioned to cooperate with the stationary contacts. The stationary contacts are mounted in triangular relationship on a block of insulating material supported in suitable manner within the casing 80 and spaced from the forward end wall thereof. The movable contact plate 108 has its contact points disposed in a triangular relationship to cooperate with the triangularly disposed stationary contacts on the block and is mounted for relative movement with respect to the block. This relative movement consists both of a tilting of the plate 108 and a shift of the plate bodily toward or away from the block to enable one or more of the switches to be closed.

Unique means (more particularly disclosed in my copending application above referred to) is provided for normally retaining the plate 108 in its neutral position shown in Fig. 3, in which the plate is in engagement with two of the stationary contacts to close one of the switches, but is disengaged from the other stationary contact to open one of the switches and for shifting the plate to one side of neutral in which it engages all of the contacts, or to the opposite side of neutral in which it is disengaged from all of the contacts. Constituting a part of the unique means is a plunger 109 slidable in a tubular extension 110 (see Fig. 1) disposed vertically below the shaft 89. The inner end of the plunger engages the plate 108 and the plunger is yieldably retained in neutral or intermediate position.

In order that the single control handle 98 may be employed to actuate both the rate and direction control as well as the start and stop control in all positions of the handle and by independent and distinct movements, the tubular extension 110 is formed with a wide slot and the plunger 109 is formed with a groove 112 which is disposed centrally of the slot when the plunger is in its neutral or intermediate position. The handle 98, as seen in Figs. 1 and 3, is formed with a segment 113, projecting into the groove 112 of the plunger 109, and is also formed with an oblong aperture for receiving the projecting flattened end of the shaft 89 on which the handle is pivotally mounted for movement in a plane longitudinal of the controller. With this mounting of the handle 98 and the construction of the start and stop control, it is apparent that the handle has a movement for the actuation of the rate and direction control which is independent and distinct from its movement for the stop and start control. Furthermore it is apparent that the start and stop control may be actuated directly and immediately regardless of the position of the handle 98 in its actuation of the rate and direction control, for the segment 113 is wide enough to engage the plunger in all positions of the handle. To close all of the switches of the start and stop control, the handle 98 is pulled forwardly, while to open all the switches the handle is pushed rearwardly of the machine.

Housed within the casing 80 at the opposite end from the start and stop control but in the same relative position is the limit control. Like the start and stop control, the limit control comprises two switches formed by three stationary contacts 115, 116 and 117 and a movable contact 118 in the form of a shiftable and tiltable plate. The stationary contacts are again mounted in triangular relationship on a block of insulating material secured to the rear end of the casing. The plate is urged toward engagement with the stationary contacts by means of compression springs (not shown). The plate 118 has three positions, with its normal position that shown in Fig. 3, in which it is in engagement with all of the stationary contacts. The first position of the plate away from normal is that in which the plate has been tilted so as to be disengaged from the stationary contact 115, but remains in engagement with contacts 116 and 117. The third position of the plate 118 is that in which it is bodily shifted out of engagement with all of the stationary contacts.

Whereas the start and stop control was actuated only manually, the limit control is intended to be actuated only automatically. To that end the rear end wall of the casing 80 is formed with a tubular extension in which is reciprocable a plunger 120 carrying a cam follower in the form of a roller 121 at its outer end. At its inner end, the plunger has a head which is adapted upon inward movement of the plunger to engage the plate 118 to move it to its successive positions. The follower is engaged by suitable dogs mounted on the carriage as will presently be described.

Having described the unitary controller, the control circuit and particularly the connections of the switches of the controller will be described in detail. The control circuit, as previously stated, includes the spindle forward and reverse contactor coils, the feed right and left contactor coils, the traverse contactor coil, and the master contactor coil, and it is by the energization or deenergization of these coils that the various contactors are closed or opened to produce the desired operation of the motors. The control circuit, as connected herein, functions to permit starting of the carriage 13 either to the right or to the left and at either fed or traverse speed, such selection of rate and direction of movement being determined, as previously stated, by the swinging of the handle 98 to the right or the left, respectively. Accordingly, the contacts 85 and 85' are connected by branch leads 125 and 125' to a common lead 126 which is connected to one stationary terminal 127 of a master stop-run button switch 128, the other stationary terminal 129 of which is connected to the line wire L1. The switch 128 is mounted on the panel 77, (see Fig. 1). Interposed in the lead 126 are two switches MC1 and MC2 of the master contactor. Stationary contact 86 is connected by a lead 132 to one end of the feed right contactor coil FRCC, the other end of which is connected to the line wire L3. Correspondingly, the stationary contact 86' is connected by a lead 133 to one end of the feed left contactor coil FLCC, the other end of which is connected to the line wire L3. Stationary contacts 83 and 83' are connected by a common lead 134 and branch leads to the lead 126 behind the switch MC2, while contacts 84 and 84' are connected by a common lead 135 and branch leads to one end of the traverse contactor coil TCC, the other end of which is connected to the line wire L3.

It will be seen that the switch including the movable contact 87 and the switch including the movable contact 87' are connected in parallel so that closure of either switch will energize the traverse contactor coil. The switch including movable contact 91 and the switch including movable contact 91', however, control respectively the feed right and the feed left contactor coils. Thus by swinging the handle 98 to the extreme right or left either the switch including contact 91 will be closed and the switch including contact 91' will be open, or vice versa, so as to complete a circuit to either the feed right or the feed left contactor coil and thereby determine the direction of rotation of the feed motor as well as of the traverse motor. If the handle 98 is retained in its extreme position to the right or the left, a circuit is also completed to the traverse contactor coil, thereby closing the contactor TC to cause the traverse motor to operate and drive the carriage at a rapid traverse rate. However, should the handle 98 be returned to neutral after being swung to the extreme either to the right or left, the switches controlling the traverse contactor coil will be open while the switch controlling the feed contactor coil will remain closed and thereby cause the feed motor only to operate for driving the carriage at a feed rate.

The switches of the start and stop control in conjunction with the switches of the limit control exercise control over the master contactor coil MCC. Accordingly, contact 105 is connected by a lead 137 to the terminal 127 of the switch 128. Contact 106, which is connected to the contact 105 by the movable contact 108, when the latter is in its neutral position, is connected by a lead 138 to stationary contact 115 of the limit control, the lead 138 moreover having interposed therein switch MC3 of the master contactor. Contact 107 of the start and stop control, which normally is out of engagement with the movable contact 108, is connected by a lead 139 with the contact 117 of the limit control. The remaining contact 116 of the limit control is connected by a lead 140 to one end of the master contactor coil which has its other end connected to the line wire L3. It will be remembered that the movable contact 118 of the limit control in its normal position is in engagement with all of the stationary contacts 115, 116 and 117.

The portion of the control circuit governing the spindle motor is so arranged that the spindle is rotated whenever the carriage is driven at a feed rate regardless of the direction of movement, but is not rotated during a traverse rate of movement of the carriage. Moreover, selector means is provided whereby the spindle may be caused to rotate in a forward direction regardless of the direction of carriage movement, in a reverse direction regardless of the direction of carriage movement, or in a forward or reverse direction depending upon the direction of carriage movement. The spindle may also be rotated independently of the operation of the feed and traverse motors.

Accordingly, one end of each the spindle forward contactor coil SFCC and the spindle reverse contactor SRCC is connected through a common lead 143 to the line wire L3. Interposed in the lead 143 is a normally closed switch TC4 which is a part of the traverse contactor TC. The other end of the spindle forward contactor coil is connected to a lead 144 and thence through three branch circuits 145, 146 and 147 to the lead 126. The first of these, namely 145, includes a push button switch 148 which is normally open and which may be manually closed to complete a circuit to the spindle forward contactor coil (assuming the master switch 128 to be closed) for the purpose of rotating the spindle independently of the feed and traverse motors. The switch 148 is mounted on the panel 77 just above the master switch 128. In parallel with the push button switch 148 is a holding switch SFC4 actuated by the spindle forward contactor to be open and closed respectively as the contactor is open or closed. In series with the holding switch SFC4 is a normally closed switch MC4 forming a part of the master contactor. The second circuit 146 includes a stationary contact 150 and blade 151 of a spindle selector switch. The third branch circuit 147 includes in series relationship a contact 152 and blade 153 of the spindle selector switch and a switch FLC4 constituting a part of the feed left contactor FLC. The circuits 146 and 147 are connected to the lead 126 intermediate the switches MC1 and MC2 of the master contactor, whereas the circuit 145 is connected between the master switch 128 and the switch MC1.

The remaining end of the spindle reverse contactor coil SRCC is connected by a lead 156 to a contact 157 adapted to be engaged by the blade 153 and includes in series relationship a switch FRC4 forming a part of the feed right contactor. Switches FLC4 and FRC4 are normally open and are closed when the feed contactor with which they are associated is closed. Thus it will be seen that with blade 151 swung to complete circuit 146 and with the blade 153 open, the spindle will always be rotated in a forward direction regardless of the direction of table movement. With the blade 151 swung to close on contact 152, and with blade 153 swung to close on contact 157, the spindle will be rotated in a forward or reverse direction depending upon which of the switches FLC4 and FRC4 is closed, this in turn depending upon the direction of carriage movement. With only blade 153 closed on contact 157, the spindle will be rotated in the reverse direction regardless of the direction of carriage movement. The switches including the blades 151 and 153 are mounted on the panel 27 and have a common actuator 158.

Connected in each line wire L1 and L3 is a fuse 160 and also connected in series relationship in the line wire L1 are two normally closed switches 161 controlled by the overload relays OLR connected in the leads to the spindle motor and the feed and traverse motor so that the entire operation of the machine will be arrested should either overload relay be actuated.

It is believed readily apparent from the foregoing description that the control provided herein is extremely flexible permitting of a wide variety of cycles of operation including both feed and traverse movements in both directions of movement and under both manual and automatic control. For the automatic control, as previously stated, suitable dogs are provided which are mounted on the carriage 13 and engage the follower 99 and the follower 121 at appropriate points in the movement of the carriage to rock the shaft 89 for changing the rate or direction of movement of the carriage and for actuating the limit control switch to arrest the carriage. Accordingly, these dogs include feed dogs which are operable to rock the shaft 89 from rapid traverse position to feed position, rapid traverse dogs which are operable to rock the shaft 89 from feed position to rapid traverse position, either from feed in one direction to traverse in the same direction or from feed in one direction to traverse in the opposite direction, thus under those circumstances also serving as reverse dogs, stop dogs operable to open the limit control switch whenever the stop dog passes the follower 121 or the stop dog may be of a type effective to open the limit switch only when the dog engages the follower in a certain direction of movement of the table, and safety dogs which operate to open the limit control switch to such extent that the machine can not be started by manipulation of the handle 98 until the table has been manually returned to a position in which the safety stop dog is disengaged from the follower 121. The purpose of this last mentioned dog is to prevent overtravel and injury to the machine should the carriage be started with the reverse dogs left off.

For purposes of describing the operation of the machine, let it be assumed a cycle of movement is desired which consists of a rapid traverse movement of the carriage from a central position to the right, a feed movement to the right, a reversal, and a rapid traverse movement to the left back to the central position where the carriage is automatically stopped, and then a corresponding cycle to the left. For such a cycle of movement, there would be secured to the carriage approximately centrally thereof a stop dog 170. Secured on either side of the stop dog 170 would be feed dogs 171 and 172 positioned at the point of the carriage movement where it is desired to effect a change from rapid traverse to feed movement. The dogs 171 and 172 are of identical construction but are inverted so that the dog 171 functions to rock the shaft 89 from rapid right to feed right, while the dog 172 rocks the shaft 89 from rapid left to feed left. Secured on either side of the stop dog 170 beyond the feed dogs are traverse and reversing dogs 173 and 174. These dogs also are of identical construction but again inverted so that the dog 173 functions to rock the shaft 89 from feed right to traverse left, while the dog 174 rocks the shaft 89 from feed left to traverse right. Preferably there is located immediately adjacent the dogs 173 and 174 a safety stop dog 175, only one being here shown.

Assuming that the work has been mounted on the carriage 13 and that the spindle head 15 has been adjusted to the suitable height to obtain the desired depth of cut and that the clutch 63 has been engaged by manipulation of the handle 63', the operation of the machine for the cycle mentioned would be as follows: The attendant would first turn the actuator 158 to adjust the blades 151 and 153 to obtain the desired operation of the spindle 16. This operation may be controlled to obtain a climb cut in both halves of the cycle or an ordinary cut in both halves of the cycle, or a climb cut in one-half and an ordinary cut in the other half. If it be assumed that it is desirable to have the spindle rotate in a direction depending upon the direction of movement of the carriage so as to obtain either climb cutting or conventional cutting in both halves of the cycle, blade 151 would be swung to close upon contact 152 and blade 153 would be swung to close upon contact 157. Next the master control switch 128 is turned to "run" position to condition the control circuit for control of the master controller. The coolant motor switch 76 also is turned to have the coolant motor off or on as desired.

The machine is now ready for operation and to initiate movement of the carriage to the right at a rapid traverse rate the attendant standing in front of the machine swings the handle 98 to his right and then pulls the handle toward himself. The first movement, that is, the swinging of the handle 98 to the right establishes a circuit to the feed right contactor soil FRCC through stationary contacts 85, 86 and movable contact 91 and, likewise, establishes a circuit to the traverse contactor coil TCC through stationary contacts 83, 84 and the movable contact 87. No energization of the coils takes place, however, because the normally open switches MC1 and MC2 are still open. The second movement of the handle 98 shifts the plunger 109 of the start-stop control inwardly permitting the movable contact 108 to close upon the contact 107. This completes a starting circuit from the line wire L1 through lead 137, contacts 105, 108 and 107, lead 139 to contact 117 of the limit control, thence through movable contact 118, contact 116 and lead 140 to the master contactor coil MCC. Energization of the master contactor coil results in the actuation of the master contactor with the closure of the normally open switches MC1, MC2 and MC3 and the opening of the normally closed switch MC4. Closure of the switches MC1 and MC2 completes the previously conditioned circuits to the traverse contactor coil and to the feed right contactor coil, thereby effecting initiation of operation of the feed and traverse motors effecting movement of the carriage to the right at a traverse rate. Closure of the switch MC3 results in the completion of a holding circuit for the master contactor coil through the contacts 105 and 106, lead 138 to the contact 115 of the limit control thence through contacts 118 and 116 and the lead 140. Upon completion of the holding circuit the attendant is free to release the handle 98. With the traverse contactor coil energized, the switch TC4 of the traverse contactor is opened to prevent the operation of the spindle during traverse movement of the carriage. With the traverse motor energized, the solenoid 74 also is energized thereby releasing the brake 73 of the traverse motor.

After the predetermined movement of the carriage to the right at a traverse rate, the dog 171 engages the follower 99 and rocks the shaft 89 from the rapid right to the neutral or feed position of the controller. Due to the lost motion between the lugs 95 and 96, this breaks the circuit to the traverse contactor coil through the contact 87, but does not interrupt the circuit to the feed right contactor coil. As a result the traverse contactor TC is returned to its normal position, deenergizing the traverse motor and closing contact TC4. The carriage 13 now continues to travel to the right at a feed rate, while closure of the switch TC4 initiates operation of the spindle because of completion of a circuit through the spindle reverse contactor previously conditioned by closure of the switch FRC4 of the feed right contactor.

After a predetermined movement of the carriage at a feed rate, dog 173 would engage follower 99 and rock shaft 89 from its neutral or feed position to traverse left position. By such rocking of the controller to rapid left position, the contacts 87' and 91' would engage their respective stationary contacts to complete circuits to the traverse contactor coil and the feed left contactor coil. As a result, as previously described, the carriage would now be driven at a traverse rate but in the opposite direction or to the left. Simultaneously the operation of the spindle would be arrested by opening of the traverse contactor switch TC4. Upon return of the carriage to its central position, the stop dog 170 would engage the follower 121 shifting the same inwardly to tilt the movable contact 118 of the limit control, thereby interrupting the holding circuit for the master contactor coil by breaking the connection between contacts 115 and 116. Deenergization of the master contactor coil causes switches MC1, MC2 and MC3 to be opened, thereby deenergizing the feed left contactor coil and the traverse contactor coil bringing the carriage to rest.

As soon as the machine is ready for the next half of the cycle, the operator again grasps the handle 98, this time simply pulling the same toward himself (the handle having been swung to the left for the rapid return) to initiate movement of the carriage to the left at a traverse rate. It is to be noted that while the stop dog 170 through the plunger 120 holds the movable contact 118 disengaged from the contact 115 to break the holding circuit for the master contactor coil, nevertheless the contacts 116 and 117 are still bridged by the contact 118 so that the starting circuit for the master contactor coil may be completed by movement of the handle 98. The steps during this half of the cycle are similar to those of the first half of the cycle just described. First the dog 172 swings the shaft 89 from rapid left to neutral or feed position so as to initiate the feed movement and then dog 174 rocks the shaft 89 to rapid right to reverse the direction of carriage movement and to return the same to central position at a traverse rate. It is to be noted, however, that during the feed movement the spindle is rotated in a direction opposite to that in which it rotated during the feed movement to the right. This results from the fact that the feed left contactor switch FLC4 in the branch circuit 147 is closed as an incident to the actuation of the feed left contactor and thus completes the circuit together with the spindle forward contactor coil. After completion of the return movement, the dog 170 again engages the follower 121 to break the holding circuit for the master contactor coil and bring the machine to rest.

The spindle may be rotated in a forward direction independently of the operation of the feed and traverse motors by closing the switch 148. This completes the circuit through the spindle forward contactor coil, causing operation of the spindle motor in a forward direction. Upon closure of the spindle forward contactor, a spindle forward contactor switch SFC4 is closed to establish a holding circuit around the switch 148 so that the spindle will continue to run after release of the switch 148. The spindle is then stopped by opening the switch 128.

Should the dog 173 for some reason be left off so that there would be no control dog to effect reversal of the carriage 13, the dog 175 would prevent movement of the carriage beyond its intended limits before any damage could be done. This dog is positioned to engage the follower 121 and serves to disengage the movable contact 118 from all of the stationary contacts of the limit control. As a result, not only is the holding circuit to the master contactor coil broken, but the starting circuit also is broken so that the master contactor coil cannot be energized by movement of the handle 98. This is so arranged as a matter of precaution compelling the attendant first to return the carriage manually within its intended limits of movement so that the plunger 120 may be released by the dog 175.

I claim as my invention:

1. In a machine tool having a carriage reciprocated at a feed and a traverse rate and to the left and to the right, electrical control mechanism for the machine tool comprising a first means having two positions respectively determining feed movement to the right or toward the left, a second means having a neutral position and an extreme position on each side of neutral, said second means in either extreme position effecting traverse movement of the carriage, manual means and automatic means having joint control over said second means, a lost motion connection between said first and second means whereby said second means actuates said first means only when swung to an extreme position, and start and stop control means independent from said first and second means.

2. In a machine tool having reversible electric feed and traverse motors and a carriage reciprocated by said motors at feed and traverse rates to the right and to the left, control mechanism comprising a left and a right contactor for both motors, a separate contactor for the traverse motor, a master control contactor, a coil for each contactor and a control circuit including said coils and a controller having a first plurality of switches associated with said left and right contactor coils selectively operable upon closure to condition a circuit for one of the coils, a second plurality of switches associated with said traverse contactor coil and operable upon closure of either switch to condition a circuit for said traverse coil, a single manually operable member for selectively actuating said switches, said master contactor exercising ultimate control over the circuits conditioned by said controller, and start and stop means associated with said master contactor coil for initiating or arresting operation of the machine tool.

3. In a machine tool having reversible electric feed and traverse motors and a carriage reciprocated by said motors at feed and traverse rates to the right and to the left, control mechanism comprising a left and a right contactor for both motors, a separate contactor for the traverse motor, a master control contactor, a coil for each contactor and a control circuit including said coils and a controller having a first plurality of switches associated with said left and right contactor coils selectively operable upon closure to condition a circuit for one of the coils, a second plurality of switches associated with said traverse contactor coil and operable upon closure of either switch to condition a circuit for said traverse coil, said master contactor exercising ultimate control over the circuits conditioned by said controller, start and stop means associated with said master contactor coil for initiating or arresting operation of the machine tool, and limit control means also associated with said master contactor coil for arresting operation of the machine tool.

4. In a machine tool having a rotatable spindle, a reversible electric motor for driving the spindle, reversible electric feed and traverse motors and a carriage reciprocated by said motors at feed and traverse rates to the right and to the left, control mechanism comprising a forward and reverse contactor for the spindle motor, a left and a right contactor for both the feed and traverse motors, a separate contactor for the traverse motor, a master control contactor, a coil for each contactor and a control circuit including said coils and a controller having a first plurality of switches associated with said left and right contactor coils selectively operable upon closure to condition a circuit for one of the coils, a second plurality of switches associated with said traverse contactor coil and operable upon closure of either switch to condition a circuit for said traverse coil, said master contactor exercising ultimate control over the circuits conditioned by said controller and said spindle contactor coils, and start and stop means associated with said master contactor coil for initiating or arresting operation of the machine tool.

5. In a machine tool having a rotatable spindle, a reversible electric motor for driving the spindle, reversible electric feed and traverse motors and a carriage reciprocated by said motors at feed and traverse rates to the right and to the left, control mechanism comprising a forward and reverse contactor for the spindle motor, a left and a right contactor for both the feed and traverse motors, a separate contactor for the traverse motor, a master control contactor, a coil for each contactor and a control circuit including said coils and a controller having a first plurality of switches associated with said left and right contactor coils selectively operable upon closure to condition a circuit for one of the coils, and a second plurality of switches associated with said traverse contactor coil and operable upon closure of either switch to condition a circuit for said traverse coil, said master contactor exercising ultimate control over the circuits conditioned by said controller and said spindle contactor coils, said left and right contactors each having a switch electrically associated with one of the spindle contactor coils to govern the direction of rotation and said traverse contactor having a switch associated with both spindle contactor coils breaking the circuit thereto when the traverse contactor is closed, and start and stop means associated with said master contactor coil for initiating or arresting operation of the machine tool.

6. In a machine tool having a reversible electric spindle motor and reversible electric feed and traverse motors, a control mechanism including two coils for determining the direction of rotation of the spindle, two coils determining the direction of rotation of the feed and traverse motors, a coil determining the operation of the traverse motor, a master contractor coil and circuit and switch means electrically associated with the two spindle coils and operable to cause the spindle motor to rotate only forwardly or to rotate only reversely during operation of the feed motor only regardless of the direction of rotation thereof, or to rotate in a forward or a reverse direction depending upon whether the feed motor is rotated in a forward or reverse direction, a rate and direction control means electrically associated with said feed right and feed left contactor coils and said traverse contactor coil, and a start and stop control means electrically associated with said master contactor coil.

7. In a machine tool having a rotatable spindle, a reversible electric motor for driving said spindle, a forward contactor and a reverse contactor for controlling the supply of current to the motor, a feed motor and a traverse motor connected to drive the carriage at feed and traverse and to the left and the right, a left contactor and a right contactor controlling the direction of rotation of the feed and traverse motors, and a traverse contactor independently controlling the starting and stopping of the traverse motor, a control circuit comprising a spindle forward, a spindle reverse, a feed right, a feed left, a traverse and a master contactor coil, and means for controlling said spindle forward contactor coil including a push button switch adapted to be manually closed for operating the spindle forward independently of the feed and traverse motors, a manually actuated switch operable when closed to cause the spindle to be rotated in a forward direction when the carriage is driven at feed rate regardless of the direction of movement of the carriage, and a manually actuated switch and a normally open electrical interlock switch associated with one of the feed contactors for causing the spindle to be rotated in a forward direction when the carriage is driven in one direction, an individual circuit for the spindle reverse contactor coil including a manually actuated switch and an electrical interlock switch associated with the other feed contactor and operable to drive the spindle in a reverse direction when the carriage is driven to the opposite direction at a feed rate, an individual circuit for said feed right contactor coil, said feed left contactor coil, said traverse contactor coil, and said master contactor coil, and a controller governing said last named individual circuits having a rate and direction control for conditioning the circuits for the feed right, feed left and traverse contactor coils, a start and stop control manually actuated and a limit control automatically actuated for governing the master contactor coil circuit jointly with said start and stop control, and a master contactor switch connected in series with the circuits for the spindle, feed and traverse contactor coils.

8. In a machine tool having a rotatable spindle, a reversible electric motor for driving said spindle, a forward contactor and a reverse contactor for controlling the supply of current to the motor, the motor being adapted to be started and stopped to start and stop rotation of the spindle and to be reversed to reverse the direction of rotation of the spindle, a carriage reciprocable relative to the spindle, a feed motor and a traverse motor connected to drive the carriage and adapted to be started and stopped to start and stop the carriage and to be reversed to reverse the direction of movement of the carriage, a left contactor and a right contactor controlling the direction of rotation of the feed and traverse motors, and a traverse contactor independently controlling the starting and stopping of the traverse motor, a control circuit comprising a spindle forward, a spindle reverse, a feed right, a feed left, a traverse and a master contactor coil, a push button switch electrically associated with said spindle forward contactor coil operable upon closure to energize said spindle forward contactor coil, a selector switch having three positions of electrical association with the spindle forward and said spindle reverse contactor coils, the first position causing the spindle forward contactor coil to be energized during the feed movement of the carriage regardless of the direction of movement of the carriage, a second position in which the spindle reverse contactor coil is energized during a feed movement of the carriage regardless of the direction of movement, and a third position conditioning circuits for both the spindle forward and the spindle reverse contactor coil with one or the other to be energized during feed movement of the carriage depending upon the direction of movement thereof, and a unitary controller having a rate and direction control electrically associated with said feed right and feed left contactor coils and said traverse contactor coil to obtain movement at a feed or a traverse rate in either direction, and a start and stop control electrically associated with said master contactor coil.

9. In a machine tool having a bed, a carriage reciprocably mounted on the bed and power means for reciprocating the carriage at a feed and a traverse rate and to the left and the right, electrical control mechanism comprising rate and direction control means, start and stop control means and stop or limit control means all independently operable, a starting circuit including said start and stop control and said stop or limit control means, manual means for actuating said rate and direction and said start and stop control means, a holding circuit including said start and stop control means and said stop or limit control means, dog means mounted on the carriage and operable to exercise joint control with said manual control over said rate and direction control means, a dog operable to actuate said stop or limit control means to break the holding circuit and bring the carriage to rest while maintaining the starting circuit conditioned for closure by the manual means, and a limit dog operable to shift said limit control means to a position breaking both the starting and the holding circuit to prevent initiation of carriage movement through the manual means.

10. In a machine tool, a bed, a carriage reciprocably mounted on said bed, a screw shaft rotatably journaled in said carriage but held against longitudinal movement relative thereto and having its ends projecting from the carriage and formed for the reception of a tool for manual rotation of the screw shaft, threaded means fixed in the bed with which said screw shaft cooperates to reciprocate the carriage upon rotation of the screw, and power means for rotating said screw shaft comprising a planetary gear device, a first electric motor connected with said planetary gear device to drive the carriage at a feed rate of movement, a second electric motor connected with said planetary gear device and operable to drive the carriage at a traverse rate of movement, and a clutch interposed in the connection between said second motor and said planetary gear device operable to disconnect the motor from the device to permit manual movement of the carriage by manual rotation of the screw shaft.

BENGT R. GRANBERG.